(12) United States Patent
Apsingekar et al.

(10) Patent No.: US 11,967,315 B2
(45) Date of Patent: *Apr. 23, 2024

(54) SYSTEM AND METHOD FOR MULTI-SPOKEN LANGUAGE DETECTION

(71) Applicant: Samsung Electronics Co., Ltd., Suwon-si (KR)

(72) Inventors: Vijendra R. Apsingekar, San Jose, CA (US); Pu Song, Newark, CA (US); Mohammad M. Moazzami, San Jose, CA (US); Asif Ali, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,335

(22) Filed: Apr. 22, 2022

(65) Prior Publication Data

US 2022/0246143 A1     Aug. 4, 2022

Related U.S. Application Data

(63) Continuation of application No. 16/731,488, filed on Dec. 31, 2019, now Pat. No. 11,322,136.

(Continued)

(51) Int. Cl.
   *G10L 15/00*      (2013.01)
   *G06N 3/08*       (2023.01)
   (Continued)

(52) U.S. Cl.
   CPC .............. *G10L 15/197* (2013.01); *G06N 3/08* (2013.01); *G06N 7/01* (2023.01); *G10L 15/005* (2013.01);
   (Continued)

(58) Field of Classification Search
   None
   See application file for complete search history.

(56) References Cited

U.S. PATENT DOCUMENTS

| 8,781,812 B2 | 7/2014 | Kadirkamanathan et al. |
| 9,569,593 B2 | 2/2017 | Casella dos Santos |

(Continued)

FOREIGN PATENT DOCUMENTS

| KR | 10-2015-0046319 A | 4/2015 |
| KR | 10-2017-0000722 A | 1/2017 |

OTHER PUBLICATIONS

Google LLC, "Talk to the Google Assistant in multiple languages", https://support.google.com/googlenest/answer/7550584?hl=en, Aug. 2019, 3 pages.

(Continued)

*Primary Examiner* — Satwant K Singh

(57) ABSTRACT

A method includes performing, using at least one processor, feature extraction of input audio data to identify extracted features associated with the input audio data. The method also includes detecting, using the at least one processor, a language associated with the input audio data by processing the extracted features using a plurality of language models, where each language model is associated with a different language. The method further includes directing, using the at least one processor, the input audio data to one of a plurality of automatic speech recognition (ASR) models based on the language associated with the input audio data.

21 Claims, 5 Drawing Sheets

Related U.S. Application Data

(60) Provisional application No. 62/790,380, filed on Jan. 9, 2019.

(51) Int. Cl.
  *G06N 7/01* (2023.01)
  *G10L 15/02* (2006.01)
  *G10L 15/16* (2006.01)
  *G10L 15/197* (2013.01)
  *G10L 15/22* (2006.01)

(52) U.S. Cl.
  CPC ............. *G10L 15/02* (2013.01); *G10L 15/16* (2013.01); *G10L 15/22* (2013.01); *G10L 2015/223* (2013.01)

(56) References Cited

U.S. PATENT DOCUMENTS

| | | | |
|---|---|---|---|
| 9,613,618 | B2 | 4/2017 | Chakladar |
| 10,317,992 | B2 * | 6/2019 | Prokofieva .............. G10L 17/22 |
| 10,438,587 | B1 * | 10/2019 | Lam ........................ G06N 3/008 |
| 11,322,136 | B2 * | 5/2022 | Apsingekar .............. G06N 3/08 |
| 2004/0143436 | A1 | 7/2004 | Huang et al. |
| 2013/0226583 | A1 | 8/2013 | Kadirkamanathan et al. |
| 2014/0067366 | A1 | 3/2014 | Jansche et al. |
| 2014/0343940 | A1 | 11/2014 | Yassa |
| 2015/0161983 | A1 | 6/2015 | Yassa |
| 2015/0287405 | A1 | 10/2015 | Biadsy et al. |
| 2016/0284349 | A1 | 9/2016 | Ravindran et al. |
| 2016/0293159 | A1 | 10/2016 | Belisario et al. |
| 2017/0140759 | A1 | 5/2017 | Kumar |
| 2017/0148431 | A1 | 5/2017 | Catanzaro et al. |
| 2017/0148433 | A1 | 5/2017 | Catanzaro et al. |
| 2018/0137857 | A1 | 5/2018 | Zhou |
| 2018/0314689 | A1 | 11/2018 | Wang et al. |
| 2018/0374476 | A1 * | 12/2018 | Lee ........................ G10L 15/22 |
| 2020/0005794 | A1 * | 1/2020 | Kim ........................ G10L 15/32 |
| 2020/0175961 | A1 | 6/2020 | Thomson et al. |

OTHER PUBLICATIONS

International Search Report and Written Opinion of the International Searching Authority dated Apr. 20, 2020 in connection with International Patent Application No. PCT/KR2020/000382, 9 pages.

Supplementary European Search Report dated Oct. 28, 2021 in connection with European Patent Application No. 20738142.7, 10 pages.

Schultz et al., "LVCSR-Based Language Identification," IEEE, 1995, 4 pages.

Shizhen et al., "Language Identification using PPRLM," ICSP'04 Proceedings, IEEE, 2004, 4 pages.

Non-Final Office Action dated Aug. 19, 2021 in connection with U.S. Appl. No. 16/731,488, 13 pages.

Notice of Allowance dated Jan. 7, 2022 in connection with U.S. Appl. No. 16/731,488, 8 pages.

Schalkwyk et al., "Teaching the Google Assistant to be Multilingual," Google AI Blog, https://ai.googleblog.com/2018/08/Multilingual-Google-Assistant.html, Aug. 2018, 4 pages.

Communication pursuant to Article 94(3) EPC dated Sep. 1, 2023 in connection with European Patent Application No. 20738142.7, 5 pages.

Shao et al., "A Method of Speech Emotion Recognition Based on Convolutional Neural Networks," and English translation of Abstract, Science and Technology Innovation Herald, Issue 6, Jul. 2016, 5 pages.

Li et al., "Broadcast Speech Language Recognition Based on Sub-Band GMM-UBM," and English translation of Abstract, Journal of Data Acquisition Processing, Issue 1, May 2007, English translation of Abstract, 5 pages.

Office Action dated Nov. 30, 2023 in connection with Chinese Patent Application No. 202080008419.5, 22 pages.

* cited by examiner

SYSTEM AND METHOD FOR MULTI-SPOKEN LANGUAGE DETECTION

CROSS-REFERENCE TO RELATED APPLICATION AND PRIORITY CLAIM

This application claims priority under 35 U.S.C. § 120 to U.S. patent application Ser. No. 16/731,488 filed on Dec. 31, 2019 (now U.S. Pat. No. 11,322,136), which claims priority under 35 U.S.C. § 119(e) to U.S. Provisional Patent Application No. 62/790,380 filed on Jan. 9, 2019. Both of these applications are hereby incorporated by reference in their entirety.

TECHNICAL FIELD

This disclosure relates generally to automatic speech recognition (ASR) systems. More specifically, this disclosure relates to a system and method for multi-spoken language detection.

BACKGROUND

Voice-based interfaces are being used more and more often as a mechanism for supporting interactions between humans and machines. These types of interfaces often include an automatic speech recognition (ASR) system, which is designed to convert speech into text. The text can then be displayed, communicated to other users, further processed or used to perform one or more functions, or used in any other suitable manner. This type of functionality is common in various applications, such as voice-based digital personal assistants on mobile electronic devices or other electronic devices.

SUMMARY

This disclosure provides a system and method for multi-spoken language detection.

In a first embodiment, a method includes performing, using at least one processor, feature extraction of input audio data to identify extracted features associated with the input audio data. The method also includes detecting, using the at least one processor, a language associated with the input audio data by processing the extracted features using a plurality of language models, where each language model is associated with a different language. The method further includes directing, using the at least one processor, the input audio data to one of a plurality of automatic speech recognition (ASR) models based on the language associated with the input audio data.

In a second embodiment, an electronic device includes at least one memory and at least one processor operatively coupled to the at least one memory. The at least one processor is configured to perform feature extraction of input audio data to identify extracted features associated with the input audio data. The at least one processor is also configured to detect a language associated with the input audio data by processing the extracted features using a plurality of language models, where each language model is associated with a different language. The at least one processor is further configured to direct the input audio data to one of a plurality of ASR models based on the language associated with the input audio data.

In a third embodiment, a non-transitory machine-readable medium contains instructions that when executed cause at least one processor of an electronic device to perform feature extraction of input audio data to identify extracted features associated with the input audio data. The medium also contains instructions that when executed cause the at least one processor to detect a language associated with the input audio data by processing the extracted features using a plurality of language models, where each language model is associated with a different language. The medium further contains instructions that when executed cause the at least one processor to direct the input audio data to one of a plurality of ASR models based on the language associated with the input audio data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
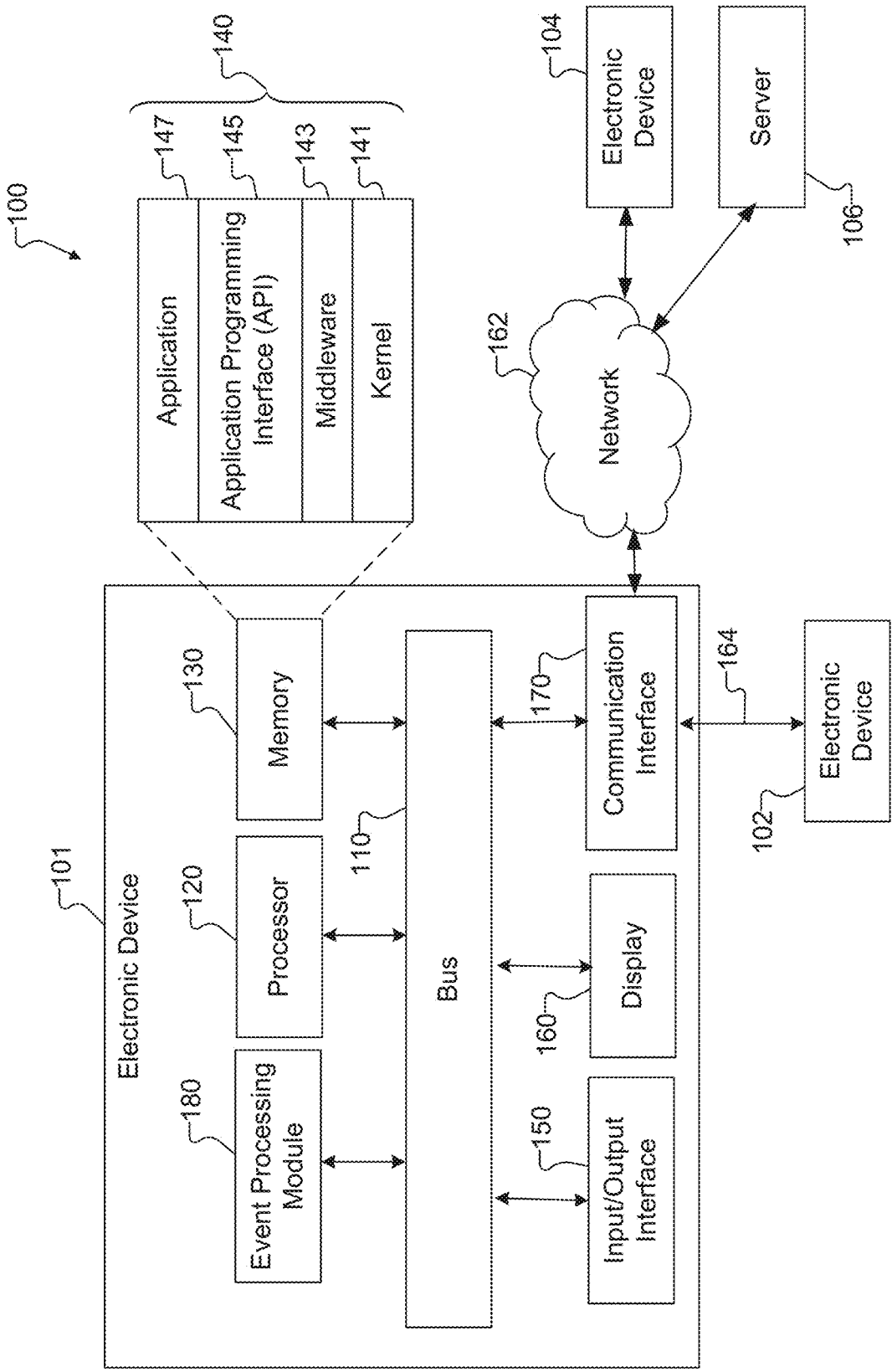
FIG. 1 illustrates an example network configuration in accordance with this disclosure.

FIGS. 1 through 5, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, voice-based interfaces are being used more and more often to support interactions between humans and machines. These types of interfaces often include an automatic speech recognition (ASR) system, which converts speech into text. In ASR systems, determining the language that is being spoken by a user is typically a prerequisite for performing automatic speech recognition operations. However, there are a number of technical challenges when it comes to performing automatic language identification, such as overlapping phonemes among different languages, overlapping characteristics of different speakers in the same language (such as native versus non-native speakers or male versus female speakers), and matching broad phoneme distributions between different languages. In some prior approaches, a user is simply given the option of selecting a specific language to be used, such as during setup of a mobile electronic device or other device. In these approaches, the user is often limited to use of that specific language, and the user typically cannot switch between different languages (at least not very easily and often not without repeating the setup process).

This disclosure provides techniques for multi-spoken language detection that, among other things, enable the automatic selection and use of one or more language-specific ASR models to process an input. As described in more detail below, a device receives input data, such as audio data associated with a user utterance. The device performs feature extraction to identify features that are associated with the input data, such as by identifying features of phonemes from the input data. The extracted features are processed using multiple language models (also called language-specific acoustic models) to identify a language associated with each of multiple portions of the input data. Depending on the input data, all portions of the input data may be associated with a single language, or different portions of the input data may be associated with different languages. Each portion of the input data may be routed to a language-specific ASR model for further processing based on the identified language of that portion, and each ASR model is tuned (trained) for a specific language. In some embodiments, the language models may be derived from the ASR models and may process a smaller number of features than the ASR models, since the identification of a language being used in the input data may involve fewer features than the recognition of actual words or phrases contained in the input data.

In this way, these techniques allow an electronic device or other device to receive and process input audio data more effectively since the language or languages associated with the input audio data can be identified automatically. Also, these techniques allow an electronic device or other device to seamlessly transition between processing different languages, without requiring a user to select different languages or re-execute a device setup process to select a different language. This may be particularly useful for users who speak multiple languages and who might switch between different languages in the same input audio data. In addition, the ability to improve the detection of spoken languages can help ASR-based systems provide better responses to user inputs and can enable systems to serve a wider population of potential users.

As a particular example of this functionality, the accuracy of an ASR system is often highly-dependent on the training of the ASR system and the conditions under which input data is provided to the ASR system for processing. While training data used to train an ASR system often contains pure speech from a specific language, input data provided to the ASR system during real-world use seldom has the same characteristics. For instance, users who speak multiple languages may often interact with a device using different languages. Using the techniques described below, one or more language-specific ASR models can be used for each user input depending on the language or languages of that user input. Thus, in some embodiments, the automated detection of a spoken language or languages associated with a particular input can be performed as part of a pre-processing operation in order to identify the language(s) and use the appropriate ASR model(s) for the identified language(s).

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication. As described in more detail below, the processor 120 may analyze input audio data, automatically identify one or more languages used in the input audio data, and process the input audio data based on the identified language(s).

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The application 147 includes one or more applications for processing input data based on automated language detection as discussed below. These functions can be performed by a single application or by multiple applications that each carries out one or more of these functions. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 or 164 may include at least one communication network, such as a computer network (like a local area network (LAN) or wide area network (WAN)), the Internet, or a telephone network.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
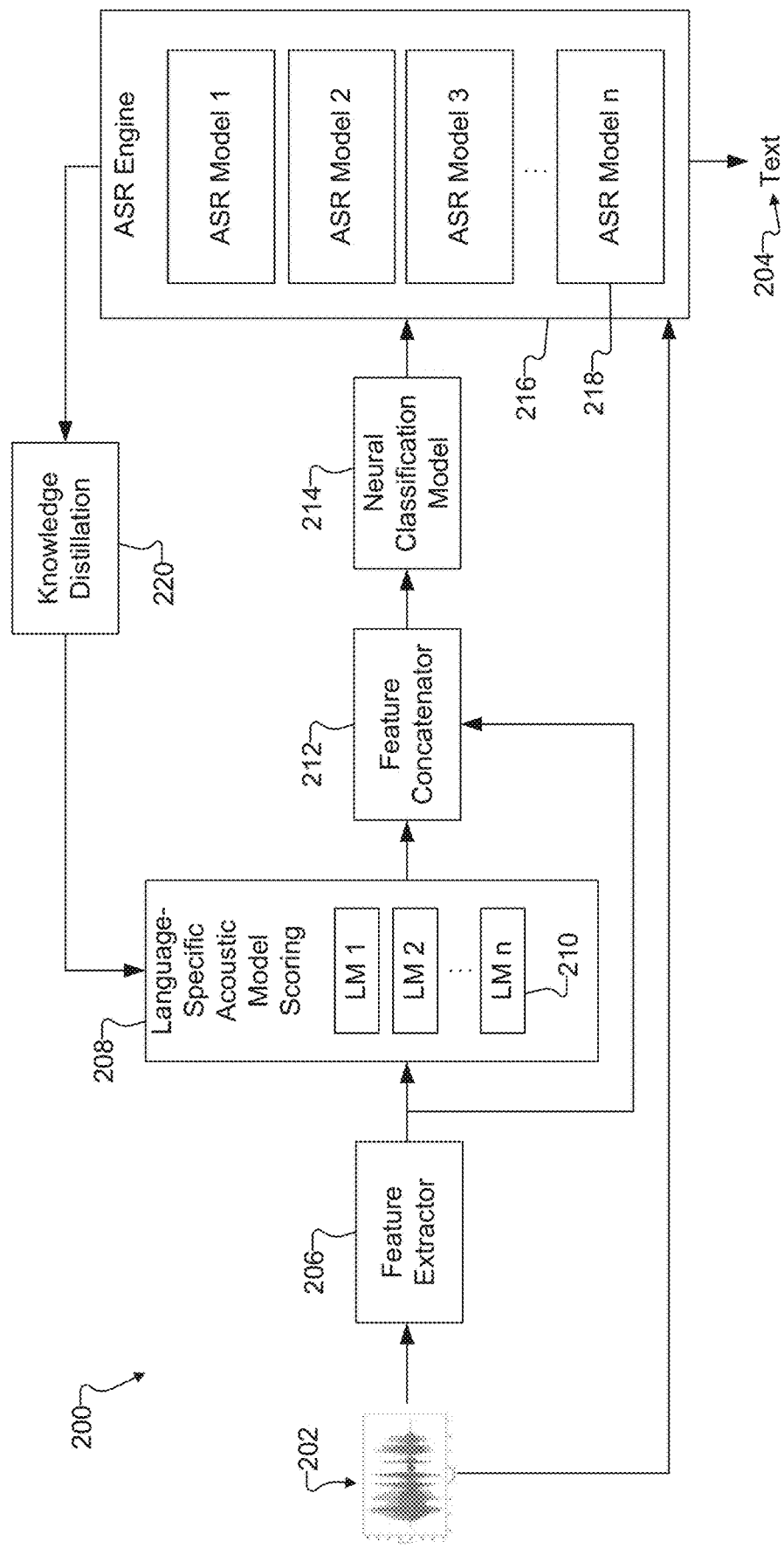
FIG. 2 illustrates an example architecture for multi-spoken language detection in accordance with this disclosure.

FIG. 2 illustrates an example architecture 200 for multi-spoken language detection in accordance with this disclosure. For ease of explanation, the architecture 200 shown in FIG. 2 may be described as being implemented using the electronic device 101 in the network configuration 100 shown in FIG. 1. However, the architecture 200 may be used by any suitable device(s) and in any suitable system(s), such as by the server 106 in the network configuration 100.

As shown in FIG. 2, the architecture 200 generally operates to receive an audio-based input 202 and generate a text-based output 204 representing the audio-based input 202. The audio-based input 202 may represent any suitable audio information containing one or more spoken words. For example, the audio-based input 202 may represent a digitized (and possibly pre-processed) version of a user utterance, which in some cases may be captured by a microphone or other component of the electronic device 101. The audio-based input 202 may include one word or multiple words spoken by at least one user, and a single language or multiple languages may be used by the user(s) when speaking. The text-based output 204 represents the audio-based input 202 converted into textual form, which is accomplished here using automatic speech recognition. Thus, the architecture 200 can process the audio-based input 202 to identify the language(s) used in the audio-based input 202 and convert words and phrases contained in the audio-based input 202 into text in the text-based output 204.

In the architecture 200, the audio-based input 202 is provided to a feature extractor 206, which generally operates to process the audio-based input 202 and extract various features from the audio-based input 202. The extracted features may represent any suitable characteristics of the audio-based input 202. In some embodiments, the extracted features include phonemes contained in the audio-based input 202. Phonemes represent units of a phonetic system of a language that are perceived to be distinctive sounds in the language. Words in many languages can be represented using a common set of phonemes, although the usage of those phonemes varies widely based on the language. Thus, the feature extractor 206 can extract phoneme features from the audio-based input 202 in order to facilitate both (i) the identification of the language or languages used in the audio-based input 202 and (ii) the conversion of the audio-based input 202 into the text-based output 204 through recognition of words and phrases contained in the audio-based input 202.

The feature extractor 206 may use any suitable technique for extracting phoneme features or other features from audio-based input 202. For example, the feature extractor 206 may operate based on a wavelet decomposition technique or a convolutional neural network technique. Various approaches have been developed for extracting features from audio input data, and additional approaches are sure to be developed in the future. This disclosure is not limited to any specific type of feature extraction technique or any particular implementation of the feature extractor 206. Also, the feature extractor 206 may express the extracted features in any suitable format. In some embodiments, for instance, extracted features may have the form of Mel-frequency cepstral coefficients (MFCCs), although the extracted features may be defined in any other suitable manner.

The extracted features of the audio-based input 202 are provided from the feature extractor 206 to a language-specific acoustic model scoring function 208, which generally operates to identify the likelihood that various portions of the audio-based input 202 are from specific languages. In this example, the scoring function 208 includes or is used in conjunction with multiple language models 210 (also referred to as language-specific acoustic models). The language models 210 are associated with different languages (or possibly different dialects of the same language, which are treated as being different languages here). In some embodiments, each language model 210 is trained or otherwise configured to calculate the probability that each portion of the audio-based input 202 is from the language on which that language model 210 has been trained or is otherwise associated. Thus, for example, the first language model 210 (LM 1) may receive a first portion of the audio-based input 202 and generate a probability that the first portion of the audio-based input 202 is from a first language, the second language model 210 (LM 2) may receive the first portion of the audio-based input 202 and generate a probability that the first portion of the audio-based input 202 is from a second language, and so on. This process can be performed by each language model 210 in order to generate probabilities that the first portion of the audio-based input 202 are from various languages, and this may occur in parallel so that the first portion of the audio-based input 202 is processed by all of the language models 210 at the same time or in an overlapping manner. Moreover, this process can be performed for second, third, and other portions of the audio-based input 202. The outputs from the scoring function 208 represent a collection of probabilities for all portions of the audio-based input 202 across all supported languages.

The language-specific acoustic model scoring function 208 can support any suitable technique for generating probabilities or otherwise determining the likelihood that various portions of audio-based input 202 are associated with various languages. For example, in some embodiments, each of the language models 210 may define multiple states and include interstate and intrastate transitions for moving between the states. Each state can apply a particular function to an input data segment in order to generate a probability of that input data segment being in a particular language. As a particular example, in some cases, the output of each language model 210 may be expressed as $P(\text{phone}_k^{lang\text{-}y}|x_t)$, where $P(\bullet)$ represents the calculated probability that a specific phoneme $\text{phone}_k$ for a specific language Zang-y is present in a particular segment $x_t$ of the audio-based input 202. Each language model 210 can therefore be used to calculate a probability for each phoneme associated with a specific language, and this can be performed for each portion (segment) of the audio-based input 202.

A feature concatenator 212 combines the outputs from the scoring function 208 to generate feature vectors. The feature vectors here may be generated in any suitable manner. For example, the feature concatenator 212 may accumulate the probabilities that are output from the scoring function 208 over time to create a matrix of values, which can then be further processed as described below. Note, however, that the feature concatenator 212 may combine the outputs from the scoring function 208 to generate feature vectors in any other suitable manner. Also, in some embodiments, the feature concatenator 212 may combine outputs from the scoring function 208 with the original extracted features generated by the feature extractor 206 (which may be referred to as "raw" features).

Figure 3:
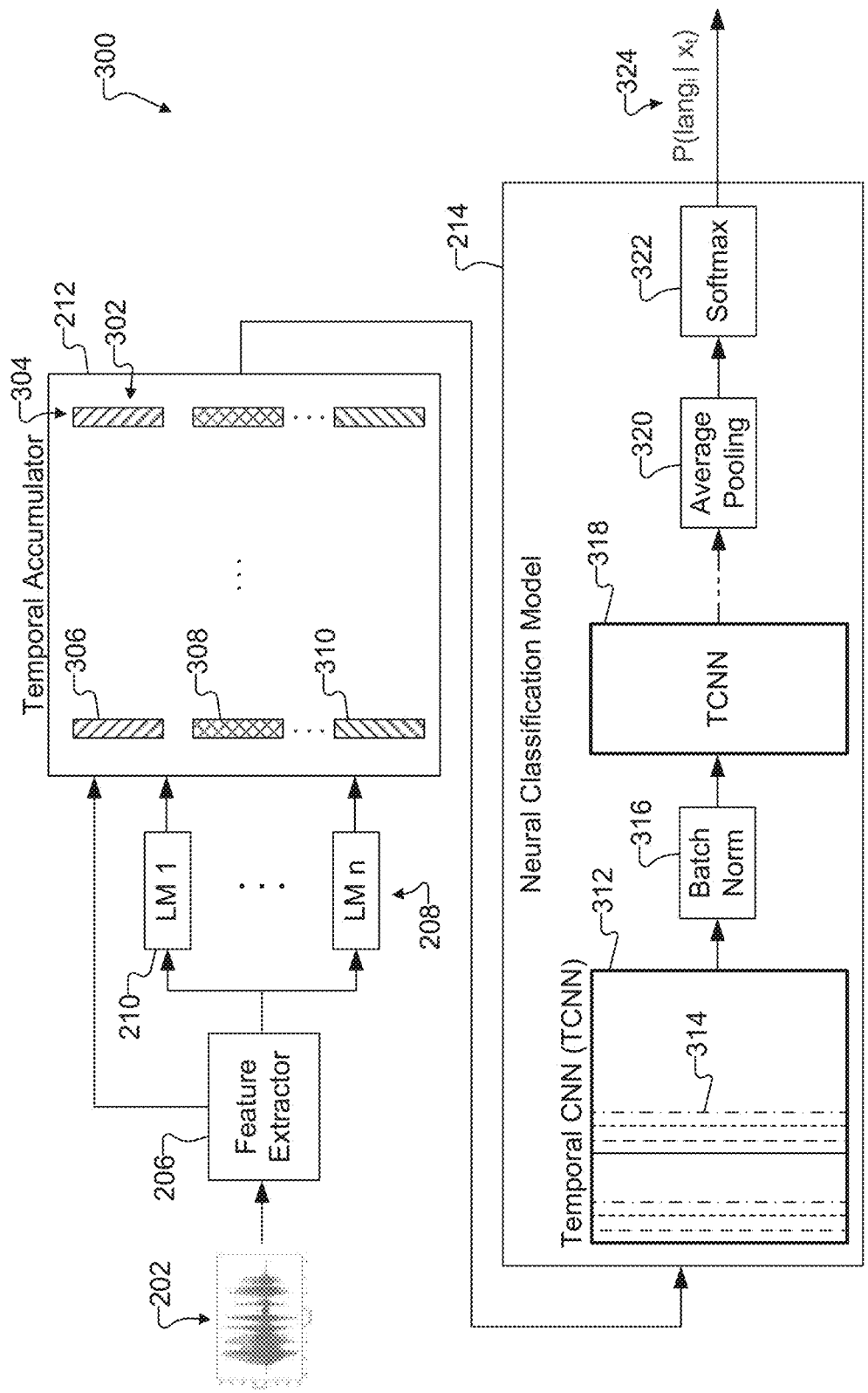
FIG. 3 illustrates a more specific example architecture for multi-spoken language detection in accordance with this disclosure.

The feature vectors produced by the feature concatenator 212 are provided to a neural classification model 214, which processes the feature vectors to identify the language or languages used in the audio-based input 202. The neural classification model 214 may use any suitable machine learning technique to process feature vectors and identify languages based on the feature vectors. For example, the neural classification model 214 may include at least one convolutional neural network and associated layers, such as normalization and pooling layers, for processing feature vectors. One example implementation of the neural classification model 214 is shown in FIG. 3, which is described below. However, it should be noted that the specific implementation of the neural classification model 214 shown in FIG. 3 is for illustration only, and the neural classification model 214 may be implemented in any other suitable manner.

The neural classification model 214 uses the identified language or languages that are associated with the audio-based input 202 to control an ASR engine 216, which generally operates to convert the audio-based input 202 (or specific portions thereof) into text. Here, the ASR engine 216 includes or is used in conjunction with multiple ASR models 218, which are associated with different languages. Each ASR model 218 can be used by the ASR engine 216 to convert at least part of the audio-based input 202 into text in the specific language associated with that ASR model 218. Thus, if the neural classification model 214 determines that a single specific language is used in the audio-based input 202, the neural classification model 214 can direct the audio-based input 202 to the ASR model 218 associated with that specific language. If the neural classification model 214 determines that multiple specific languages are used in the audio-based input 202, the neural classification model 214 can direct different portions of the audio-based input 202 to the different ASR models 218 associated with those specific languages. The ASR engine 216 can then use that specific ASR model 218 or those specific ASR models 218 to generate the text-based output 204 for the audio-based input 202.

In this way, the architecture 200 is able to automatically identify the language or languages being used in the audio-based input 202 and to automatically route the audio-based input 202 or portions thereof to the appropriate ASR model(s) 218. Among other things, this allows the same user or different users of an electronic device 101 to interact with the electronic device 101 using different languages. This also allows the same user to switch between different languages in the same audio-based input 202. In other words, the architecture 200 is able to seamlessly switch between different languages with little or no user input (other than the user or users switching between different languages when speaking).

Note that the features used by the scoring function 208 to support language identification may include at least some of the same features used by the ASR engine 216 to support language recognition (meaning the recognition of specific words spoken in a specific language). As a result, the language models 210 used by the scoring function 208 may be similar in form to the ASR models 218 used by the ASR engine 216. However, as noted above, the language models 210 used by the scoring function 208 may require the use of fewer extracted features to perform language identification as compared to the number of extracted features used by the ASR models 218 to perform language recognition. As a particular example, in some cases, over one thousand features may be used by the ASR engine 216 to perform language recognition, while a smaller set of features (such as one or several hundred features) may be used by the language models 210 to perform language identification.

In some embodiments, to support the use of fewer features in the language models 210, a knowledge distillation function 220 is used in or in conjunction with the architecture 200. The knowledge distillation function 220 operates to take a larger trained model (such as an ASR model 218) and train a smaller model (such as an associated language model 210) to mimic the behavior of or the results obtained from the larger model. In other words, the knowledge distillation function 220 can take an ASR model 218 that has been trained for language recognition of a particular language and generate a smaller language model 210 trained for language identification of that same language. This allows the language models 210 to be generated based on trained ASR models 218. Note, however, that the language models 210 may be trained in any other suitable manner. The knowledge distillation function 220 may use any suitable technique for generating smaller models based on larger trained models.

The ASR models 218 can also be trained in any suitable manner. For example, each ASR model 218 may be trained by providing known words and phrases in a specific language to the feature extractor 206 and training the ASR model 218 associated with that specific language to recognize the known words and phrases. Various approaches have been developed for training models to recognize words and phrases in various languages, and additional approaches are sure to be developed in the future. This allows additional languages to be easily added to the architecture 200, such as by training an additional ASR model 218 for a new language and then using the knowledge distillation function 220 to generate a language model 210 for the new language.

The architecture 200 shown in FIG. 2 and described above may be used in any suitable manner. For instance, one example use case of the architecture 200 is in an electronic device 101 or other device used in a home, office, or other setting where different people speak different languages. The electronic device 101 may receive and process utterances from various users in different languages and provide responses based on the identified text associated with the user utterances. As a specific example, an electronic device 101 can receive a question (such as "How is the weather?") from a first user and provide a response (such as "The weather is warm and sunny."). The same electronic device 101 could receive the same question from a second user in a different language (such as Korean) and provide the same response to the second user (although the response may also be in Korean). The same electronic device 101 could also receive the same question from a third user in a different language (such as Hindi) and provide the same response to the third user (although the response may also be in Hindi). The users are not required to perform any setup operations or otherwise actively perform operations to change the language recognized by the electronic device 101.

Although FIG. 2 illustrates one example of an architecture 200 for multi-spoken language detection, various changes may be made to FIG. 2. For example, the scoring function 208 may include or be used in conjunction with any suitable number of language models 210, and the ASR engine 216 may include or be used in conjunction with any suitable number of ASR models 218.

FIG. 3 illustrates a more specific example architecture 300 for multi-spoken language detection in accordance with this disclosure. In particular, the architecture 300 shown in FIG. 3 may represent a more detailed implementation of part of the architecture 200 shown in FIG. 2. For this reason, various reference numbers used in FIG. 2 are also used in FIG. 3 to represent common components between the architectures 200 and 300. For ease of explanation, the architecture 300 shown in FIG. 3 may be described as being implemented using the electronic device 101 in the network configuration 100 shown in FIG. 1. However, the architecture 300 may be used by any suitable device(s) and in any suitable system(s), such as by the server 106 in the network configuration 100.

As shown in FIG. 3, the audio-based input 202 is provided to the feature extractor 206, which identifies extracted features from the audio-based input 202. The extracted features are provided to the language-specific acoustic model scoring function 208, which uses the multiple language models 210 to identify probabilities or other likelihoods that different portions of the audio-based input 202 are in specific languages. The raw extracted features from the audio-based input 202 and the probabilities from the scoring function 208 are provided to the feature concatenator 212.

The feature concatenator 212 combines the raw extracted features and the probabilities to form feature vectors. In this particular example, the feature concatenator 212 is implemented using a temporal accumulator, which accumulates various information generated by the feature extractor 206 and the scoring function 208 over time. Essentially, the feature concatenator 212 stacks the information generated by the feature extractor 206 and the scoring function 208 to form the feature vectors, which are then further processed by the neural classification model 214.

In the specific example shown in FIG. 3, information is accumulated by the feature concatenator 212 in rows 302 and columns 304. Each row 302 is associated with data from a different source. In particular, the first row 302 in this example includes raw extracted features 306 from the feature extractor 206, the second row 302 in this example includes probabilities 308 calculated using the first language model 210, and the last row 302 in this example includes probabilities 310 calculated using the last language model 210. Note that additional rows containing probabilities calculated using additional language models 210 may similarly be accumulated by the feature concatenator 212. Each column 304 is associated with a different time and thereof a different portion of the audio-based input 202. For instance, the first column 304 may contain raw extracted features 306 and probabilities 308 and 310 associated with a first portion of the audio-based input 202 (such as a first 20 millisecond segment), the next column 304 may contain raw extracted features 306 and probabilities 308 and 310 associated with a second portion of the audio-based input 202 (such as a second 20 millisecond segment), and so on. The number of columns 304 that are stacked or accumulated by the feature concatenator 212 for further processing can vary based on a number of factors. In some cases, the columns 304 may span a specified period of time, such as one second, two seconds, three seconds, or five seconds.

Note that the inclusion of the raw extracted features 306 from the feature extractor 206 in the accumulated information provided by the feature concatenator 212 is optional. In other words, the feature concatenator 212 may concatenate the probabilities 308, 310 from the language models 210 and exclude the extracted features 306 in the accumulated information. However, it has been determined that the inclusion of the raw extracted features 306 in the feature vectors processed by the neural classification model 214 may improve language identification by the neural classification model 214 in some instances.

The feature vectors provided by the feature concatenator 212 are processed by the neural classification model 214, which in this example includes a temporal convolutional neural network (TCNN) 312. The temporal convolutional neural network 312 applies a convolution function to the information provided by the feature concatenator 212. More specifically, the temporal convolutional neural network 312 applies a convolution function to the information within a window 314, and the window 314 moves or slides so that the temporal convolutional neural network 312 can apply the convolution function to different subsets of the information from the feature concatenator 212. In this way, the temporal convolutional neural network 312 can apply the convolution function in an overlapping manner to the raw extracted features 306 and probabilities 308 and 310 provided by the feature concatenator 212.

In some cases, the window 314 may have a height that matches the combined heights of the raw extracted features 306 and all probabilities (including the probabilities 308 and 310) provided by the feature concatenator 212, in which case the window 314 may slide horizontally but not vertically. Note, however, that other embodiments may be used for the window 314. Also, the window 314 may have a width that is significantly smaller than the combined widths of the raw extracted features 306 and all probabilities (including the probabilities 308 and 310) provided by the feature concatenator 212. In some embodiments, the width of the window 314 may be based on the number of features being stacked by the feature concatenator 212. As a particular example, if the information from the feature concatenator 212 spans two hundred samples widthwise, the window 314 may have a width of twenty samples. Again, however, note that other embodiments may be used for the window 314.

The convoluted outputs from the temporal convolutional neural network 312 are provided to a batch normalization function 316, which normalizes the convoluted outputs from the temporal convolutional neural network 312. The batch normalization function 316 can use any suitable technique to normalize the convoluted outputs from the temporal convolutional neural network 312. The normalized convoluted outputs from the temporal convolutional neural network 312 are then provided to another temporal convolutional neural network 318, which may operate in the same or similar manner as the temporal convolutional neural network 312. The temporal convolutional neural network 318 may be followed by another batch normalization function. Note that any suitable number of temporal convolutional neural networks and batch normalization functions may be used here. In some embodiments, for instance, the neural classification model 214 may include between three and five temporal convolutional neural networks, and each temporal convolutional neural network may be followed by a batch normalization function.

A pooling layer 320 processes the convoluted outputs produced by the final temporal convolutional neural network (possibly after normalization) and selects or combines the convoluted outputs for input to an activation function of the neural classification model 214. In this example, the pooling layer 320 combines the convoluted outputs from the final temporal convolutional neural network by averaging groups of convoluted values and outputting the average convoluted values. The various temporal convolutional neural networks, batch normalization functions, and pooling layer are used here to model each language that is supported by the architecture 300, allowing these components to effectively score the likelihood of each language being used in the audio-based input 202.

The activation function of the neural classification model 214 is implemented in this example using a softmax function 322. The softmax function 322 receives the average convoluted values from the pooling layer 320 and operates to calculate final probabilities 324, which identify the probability of each language being associated with at least part of the audio-based input 202. Here, the final probabilities 324 may be expressed as $P(lang_t|x_t)$, where $P(\cdot)$ represents the calculated probability that a specific language $lang_t$ is associated with a particular time instant $x_t$ of the audio-based input 202. For each portion of the audio-based input 202, the probabilities across all languages can be used to identify the ASR model 218 that should be used to process that portion of the audio-based input 202.

Note that, in some embodiments, the softmax function 322 can also be configured to consider the amount of silence in the audio-based input 202 when identifying the language(s) associated with the audio-based input 202. For example, in many cases (even during active conversations), a large percentage of the audio-based input 202 may be associated with silence (or at least no one actually speaking). In some cases, the amount of silence in the audio-based input 202 may actually exceed 50% of the entire duration of the audio-based input 202. The softmax function 322 may therefore operate to exclude portions of the audio-based input 202 that are associated with silence. In some embodiments, the softmax function 322 may calculate probabilities for various languages while excluding silent portions (also called empty portions) of the audio-based input 202 in the following manner:

$$P(lang_t|X) = \Sigma_{t=0}^{T}I/[(P(lang_t=sil|x_t)>0.5)]P(lang_t|x_t)$$

Here, X represents a length of the audio-based input 202 from a time t of zero to a time t of $T_x$, and I represents an identity matrix whose size depends on the number of languages associated with non-silent times above a threshold value (0.5 in this example, although other thresholds may be used here).

Based on the probabilities output by the softmax function 322, the audio-based input 202 can be directed in its entirety to a single ASR model 218 when a single language is identified, or different portions of the audio-based input 202 can be directed to different ASR models 218 when multiple language are identified. As a result, inputs in different languages can be routed automatically to appropriate ASR models 218 for processing, and portions of the same input in different languages also can be routed automatically to appropriate ASR models 218 for processing.

Although FIG. 3 illustrates a more specific example of an architecture 300 for multi-spoken language detection, various changes may be made to FIG. 3. For example, the scoring function 208 may include or be used in conjunction with any suitable number of language models 210. Also, the feature concatenator 212 may temporally accumulate or otherwise combine any suitable number of inputs over any suitable time period. In addition, the neural classification model 214 may be implemented using any other suitable machine learning architecture or other architecture.

Figure 4:
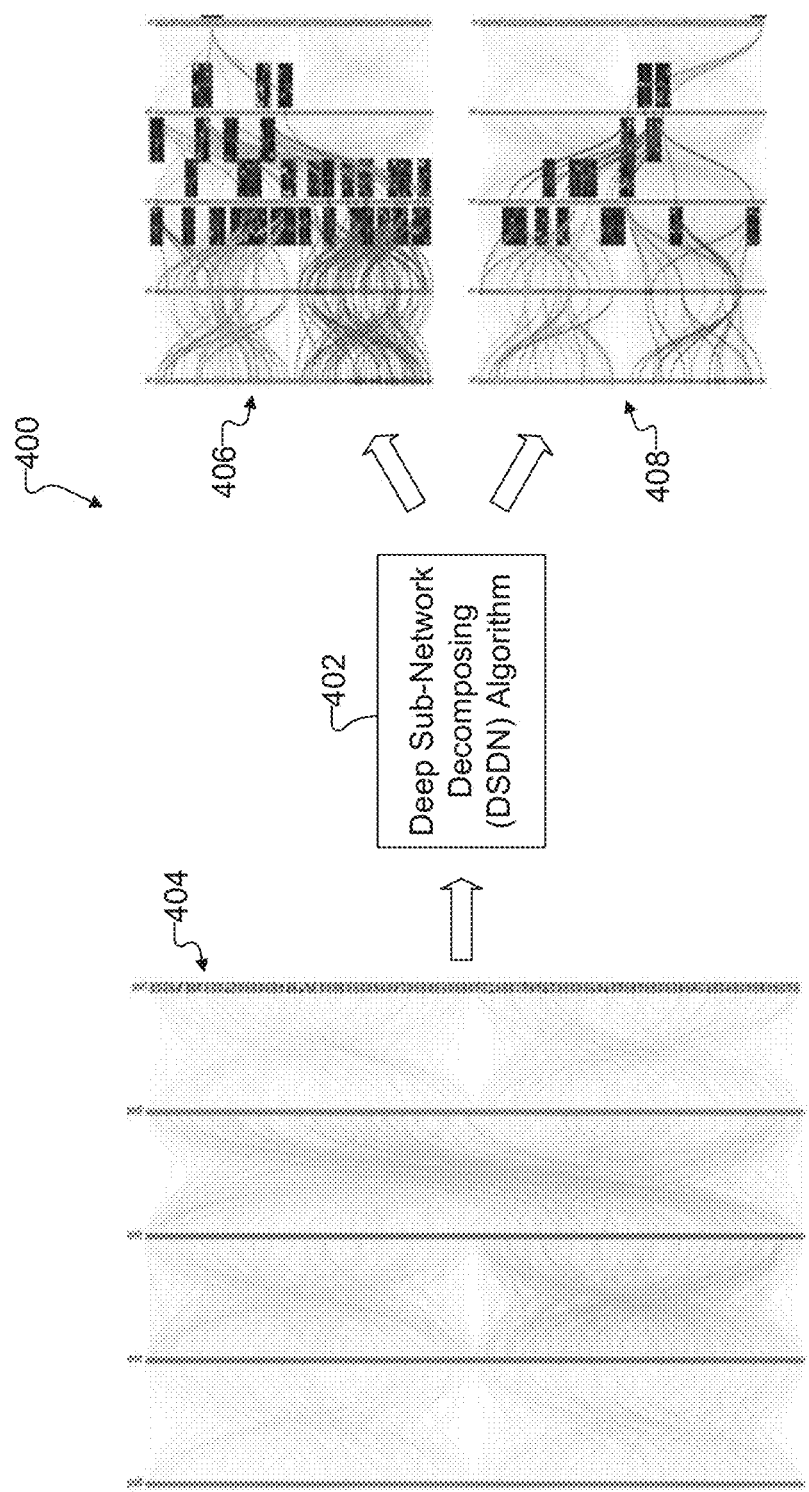
FIG. 4 illustrates an example architecture for supporting the identification of transitions between multiple languages in accordance with this disclosure.

FIG. 4 illustrates an example architecture 400 for supporting the identification of transitions between multiple languages in accordance with this disclosure. For ease of explanation, the architecture 400 shown in FIG. 4 may be described as being implemented using the electronic device 101 in the network configuration 100 shown in FIG. 1. However, the architecture 400 may be used by any suitable device(s) and in any suitable system(s), such as by the server 106 in the network configuration 100.

As described above, it is possible in some cases for an audio-based input 202 to be associated with multiple languages, such as when a user switches between languages while speaking. In these cases, different portions of the same audio-based input 202 are associated with different languages and can be directed to different ASR models 218 for processing. Here, the different portions of the audio-based input 202 may be identified as being associated with the different languages using the approaches above. However, for certain portions of the audio-based input 202 that involve transitions between different languages, it may be more difficult to identify the language to be used. Thus, in some embodiments, additional processing may be performed to identify when the language being used in the audio-based input 202 dynamically changes.

As shown in FIG. 4, the architecture 400 includes a deep sub-network decomposing (DSND) algorithm 402. The DSND algorithm 402 here has access to a large language model 404 associated with various languages. In some cases, for example, the language model 404 may be associated with many languages (such as a universal model). The DSND algorithm 402 supports knowledge distillation in order to take the large language model 404 and generate multiple sub-network models, such as sub-network models 406 and 408.

Each sub-network model 406 and 408 can be trained to identify a jump between a different set of languages, and outputs of each sub-network model can be treated as a new feature vector used for language identification. For example, one sub-network model 406 may be trained to identify when a speaker transitions from English to Korean, and another sub-network model 408 may be trained to identify when a speaker transitions from English to Hindi. Note that these are examples only and that sub-network models may be trained to identify when a speaker transitions between any suitable languages. This may allow a digital personal assistant or other ASR-based system to more accurately detect when a user dynamically switches between languages, which may allow the ASR-based system to more accurately respond to multi-language inputs. The DSND algorithm 402 supports any suitable knowledge distillation or other technique for generating sub-network models based on a larger model.

The various sub-network models may be used in any suitable manner in the architectures 200, 300 described above or in other architectures designed in accordance with this disclosure. For instance, in the architecture 200 of FIG. 2, the sub-network models may be used after the neural classification model 214 to help improve the language detection functionality provided by the neural classification model 214. In the architecture 300 of FIG. 3, the sub-network models may be used after the last temporal convolutional neural network (and optionally after the last batch normalization function) to again help improve the language detection functionality provided by the neural classification model 214. However, it should be noted that use of sub-network models is not required in either of the architectures 200, 300.

The functionality provided by the sub-network models may be useful when a user speaks a specific language utterance that is embedded within an utterance in a different language. For instance, a user might provide the following utterance as input to an electronic device 101:

"How are you doing" in Hindi is said as "आप कैसे हैं." What is it in Korean?

The various sub-network models may be used to identify the transitions between English and Hindi in the above example. This may allow the electronic device 101 or other device to more effectively route the English portions of the utterance to an English-based ASR model 218 and the Hindi portion of the utterance to a Hindi-based ASR model 218. Of course, the example above is for illustration only, and any other suitable multi-language utterance involving any number of languages may be processed here.

Although FIG. 4 illustrates one example of an architecture 400 for supporting the identification of transitions between multiple languages, various changes may be made to FIG. 4. For example, the architecture 400 may include any other number of sub-network models. Also, any other suitable technique may be used to identify or handle language transitions in input utterances.

Figure 5:
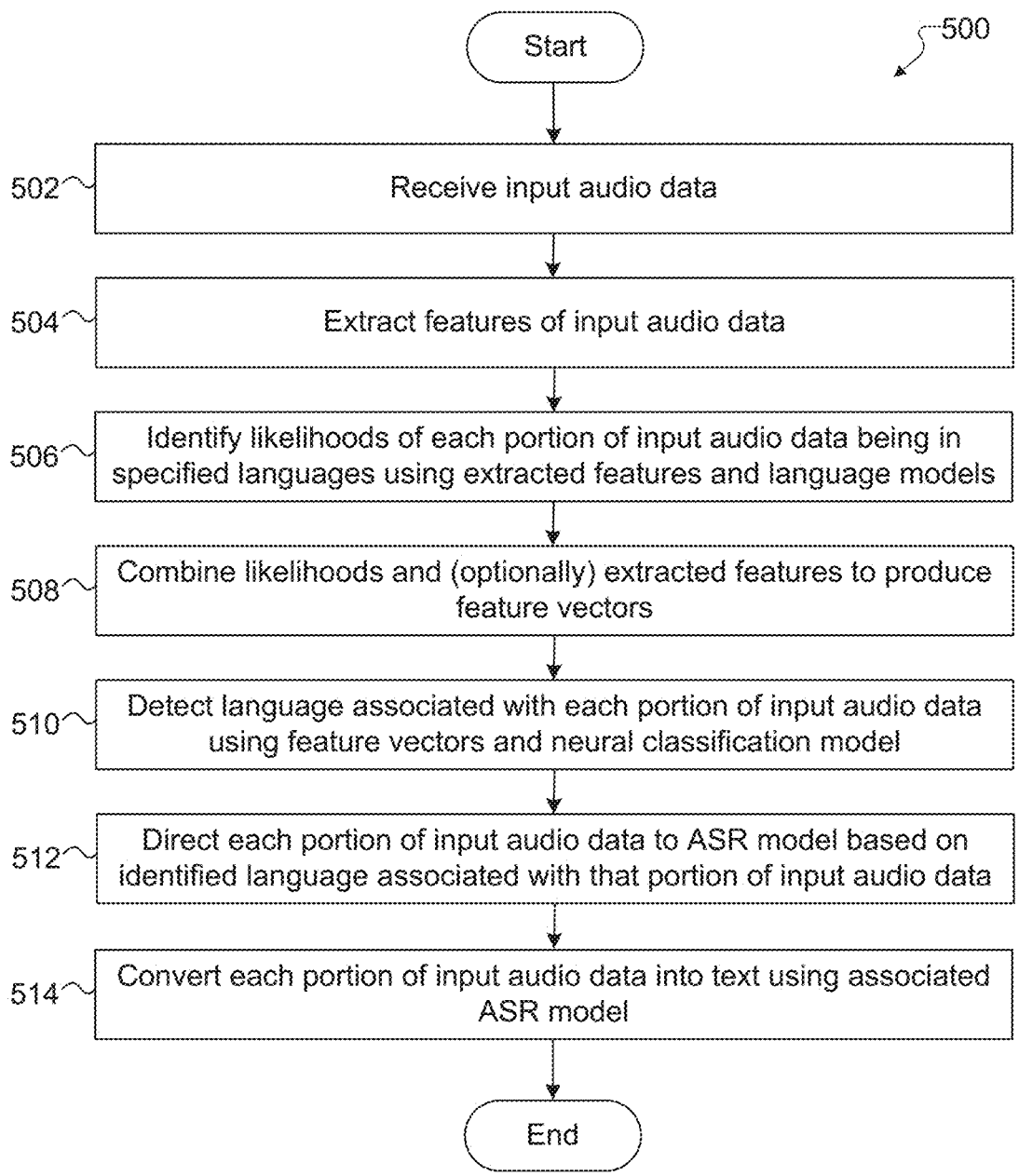
FIG. 5 illustrates an example method for multi-spoken language detection in accordance with this disclosure.

FIG. 5 illustrates an example method 500 for multi-spoken language detection in accordance with this disclosure. For ease of explanation, the method 500 shown in FIG. 5 may be described as being performed by the electronic device 101 in the network configuration 100 shown in FIG. 1. However, the method 500 may be performed by any suitable device(s) and in any suitable system(s), such as by the server 106 in the network configuration 100.

As shown in FIG. 5, input audio data is received at step 502. This may include, for example, the processor 120 of the electronic device 101 receiving audio-based input 202 representing a digitized and possibly pre-processed version of a user utterance captured by a microphone of the electronic device 101. The user utterance may include one or more words that are spoken in one or more languages, but the specific word(s) and specific language(s) are not known at this point. Features of the input audio data are extracted at step 504. This may include, for example, the processor 120 of the electronic device 101 using the feature extractor 206 to extract phoneme or phoneme-based features from the audio-based input 202. Of course, any other or additional features of the audio-based input 202 may also or alternatively be extracted here.

Likelihoods of each of multiple portions of the input audio data being in specific languages are determined at step 506. This may include, for example, the processor 120 of the electronic device 101 using the language models 210 to process the extracted features and determine probabilities that each portion of the audio-based input 202 were spoken in specific languages. The different portions of the audio-based input 202 here may represent different segments, such as segments spanning a given time period (like 20 milliseconds). However, the different portions of the audio-based input 202 may be identified in any other suitable manner.

The determined likelihoods and optionally the extracted features of the input audio data are combined to produce feature vectors at step 508. This may include, for example, the processor 120 of the electronic device 101 using the feature concatenator 212 to temporally accumulate or otherwise combine the identified probabilities 308, 310 from the language models 210 and optionally the raw extracted features 306 from the feature extractor 206 over time.

A language associated with each portion of the input audio data is detected using the feature vectors and a neural classification model at step 510. This may include, for example, the processor 120 of the electronic device 101 using the neural classification model 214 to determine final probabilities of each portion of the audio-based input 202 being associated with specific languages. As a particular example, this may include the processor 120 of the electronic device 101 using one or more temporal convolutional neural networks, one or more batch normalization functions, at least one pooling layer, and at least one activation function to process the identified probabilities 308, 310 and optionally the raw extracted features 306 accumulated over a time period. Each temporal convolutional neural network may use a sliding window 314 to process its input data and apply a convolution function to that input data.

Each portion of the input audio data is directed to an ASR model based on the identified language for that portion of the input audio data at step 512. This may include, for example, the processor 120 of the electronic device 101 causing the audio-based input 202 to be provided to a single ASR model 218 if a single language is associated with the audio-based input 202. This may also include the processor 120 of the electronic device 101 causing different portions of the audio-based input 202 to be provided to different ASR models 218 if those portions of the audio-based input 202 are associated with different languages. Each portion of the input audio data is converted into text or is otherwise understood using the associated ASR model at step 514. This may include, for example, the processor 120 of the electronic device 101 using the ASR engine 216 with the appropriate ASR model(s) 218 to convert the audio-based input 202 into a text-based output 204.

Although FIG. 5 illustrates one example of a method 500 for multi-spoken language detection, various changes may be made to FIG. 5. For example, while shown as a series of steps, various steps in FIG. 5 may overlap, occur in parallel, occur in a different order, or occur any number of times.

It should be noted here that while often described above as not requiring user input to identify a language or languages associated with input audio data, some embodiments of this disclosure may use some form of user input when identifying the language or languages associated with input audio data. For example, most users may typically speak only a handful of languages, such as two or three languages (although larger numbers are also possible for certain users). In some instances, a user may identify the language(s) that might be spoken to an electronic device 101 or other device, and that information may be used to control which language models 210, ASR models 218, and possibly sub-network models 406 and 408 are used to process input audio data. A user may identify the language(s) that might be spoken to the device in any suitable manner and at any suitable time(s), such as during a device setup process or by accessing a settings menu. If multiple users might use an electronic device 101 or other device, the languages spoken by a specific user might be stored in a user profile for that user, and the user profile may be used to control which language models 210, ASR models 218, and possibly sub-network models 406 and 408 are used to process input audio data when that user is present. Note that any other suitable technique may be used to limit the number of languages analyzed at any particular time, or all supported languages may be used at any particular time (or at all times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
performing, using at least one processor, feature extraction of input audio data to identify extracted features associated with the input audio data;
detecting, using the at least one processor, a language associated with the input audio data by processing the extracted features using a plurality of language models, each language model associated with a different language; and
directing, using the at least one processor, the input audio data to one of a plurality of automatic speech recognition (ASR) models based on the language associated with the input audio data;
wherein each of the language models is associated with but separate from a corresponding one of the ASR models.

2. The method of claim 1, wherein:
the language models are distilled from the ASR models; and
the language models use a smaller number of features compared to the ASR models.

3. The method of claim 1, wherein each language model is used to determine a probability that the input audio data is from a particular language.

4. The method of claim 3, wherein detecting the language associated with the input audio data further comprises:
concatenating the probabilities determined using the language models; and
processing the concatenated probabilities using a neural classification model.

5. The method of claim 4, wherein processing the concatenated probabilities using the neural classification model comprises:
processing the concatenated probabilities using a plurality of temporal convolutional neural networks, wherein outputs from at least one of the temporal convolutional neural networks are normalized;
averaging outputs or normalized outputs from a last of the temporal convolutional neural networks; and
determining probabilities that specific languages are associated with the input audio data based on the averaged outputs.

6. The method of claim 5, wherein detecting the language associated with the input audio data further comprises:
applying the probabilities that the specific languages are associated with the input audio data to a plurality of sub-network models tuned for transitions between different languages; and
utilizing outputs of the sub-network models as a feature vector for language classification of the input audio data.

7. The method of claim 1, further comprising:
processing the input audio data using the ASR model at which the input audio data is directed; and
generating text for the input audio data using the ASR model at which the input audio data is directed.

8. An electronic device comprising:
at least one memory; and
at least one processor operatively coupled to the at least one memory and configured to:
perform feature extraction of input audio data to identify extracted features associated with the input audio data;
detect a language associated with the input audio data by processing the extracted features using a plurality of language models, each language model associated with a different language; and
direct the input audio data to one of a plurality of automatic speech recognition (ASR) models based on the language associated with the input audio data;
wherein each of the language models is associated with but separate from a corresponding one of the ASR models.

9. The electronic device of claim 8, wherein:
the language models are distilled from the ASR models; and
the language models use a smaller number of features compared to the ASR models.

10. The electronic device of claim 8, wherein the at least one processor is configured to use each language model to determine a probability that the input audio data is from a particular language.

11. The electronic device of claim 10, wherein, to detect the language associated with the input audio data, the at least one processor is configured to:
concatenate the probabilities determined using the language models; and
process the concatenated probabilities using a neural classification model.

12. The electronic device of claim 11, wherein, to process the concatenated probabilities using the neural classification model, the at least one processor is configured to:
process the concatenated probabilities using a plurality of temporal convolutional neural networks, wherein outputs from at least one of the temporal convolutional neural networks are normalized;
average outputs or normalized outputs from a last of the temporal convolutional neural networks; and
determine probabilities that specific languages are associated with the input audio data based on the averaged outputs.

13. The electronic device of claim 12, wherein, to detect the language associated with the input audio data, the at least one processor is further configured to:
apply the probabilities that the specific languages are associated with the input audio data to a plurality of sub-network models tuned for transitions between different languages; and
utilize outputs of the sub-network models as a feature vector for language classification of the input audio data.

14. The electronic device of claim 8, wherein the at least one processor is further configured to:
process the input audio data using the ASR model at which the input audio data is directed; and
generate text for the input audio data using the ASR model at which the input audio data is directed.

15. A non-transitory machine-readable medium containing instructions that when executed cause at least one processor of an electronic device to:

perform feature extraction of input audio data to identify extracted features associated with the input audio data;

detect a language associated with the input audio data by processing the extracted features using a plurality of language models, each language model associated with a different language; and direct the input audio data to one of a plurality of automatic speech recognition (ASR) models based on the language associated with the input audio data;

wherein each of the language models is associated with but separate from a corresponding one of the ASR models.

16. The non-transitory machine-readable medium of claim 15, wherein:

the language models are distilled from the ASR models; and the language models use a smaller number of features compared to the ASR models.

17. The non-transitory machine-readable medium of claim 15, further containing instructions that when executed cause the at least one processor to use each language model to determine a probability that the input audio data is from a particular language.

18. The non-transitory machine-readable medium of claim 17, wherein the instructions that when executed cause the at least one processor to detect the language associated with the input audio data further comprise:

instructions that when executed cause the at least one processor to:

concatenate the probabilities determined using the language models; and process the concatenated probabilities using a neural classification model.

19. The non-transitory machine-readable medium of claim 15, further containing instructions that when executed cause the at least one processor to:

process the input audio data using the ASR model at which the input audio data is directed; and generate text for the input audio data using the ASR model at which the input audio data is directed.

20. A non-transitory machine-readable medium containing instructions that when executed cause at least one processor of an electronic device to:

perform feature extraction of input audio data to identify extracted features associated with the input audio data;

detect a language associated with the input audio data by processing the extracted features using a plurality of language models, each language model associated with a different language; and direct the input audio data to one of a plurality of automatic speech recognition (ASR) models based on the language associated with the input audio data;

wherein the instructions that when executed cause the at least one processor to detect the language associated with the input audio data comprise instructions that when executed cause the at least one processor to:

use each language model to determine a probability that the input audio data is from a particular language;

concatenate the probabilities determined using the language models; and process the concatenated probabilities using a neural classification model; and wherein the instructions that when executed cause the at least one processor to process the concatenated probabilities using the neural classification model comprise instructions that when executed cause the at least one processor to:

process the concatenated probabilities using a plurality of temporal convolutional neural networks, wherein outputs from at least one of the temporal convolutional neural networks are normalized;

average outputs or normalized outputs from a last of the temporal convolutional neural networks; and determine probabilities that specific languages are associated with the input audio data based on the averaged outputs.

21. The non-transitory machine-readable medium of claim 20, wherein the instructions that when executed cause the at least one processor to detect the language associated with the input audio data further comprise:

instructions that when executed cause the at least one processor to:

apply the probabilities that the specific languages are associated with the input audio data to a plurality of sub-network models tuned for transitions between different languages; and utilize outputs of the sub-network models as a feature vector for language classification of the input audio data.

* * * * *